(12) United States Patent
Rosendahl et al.

(10) Patent No.: US 7,823,695 B2
(45) Date of Patent: Nov. 2, 2010

(54) CLOSING SYSTEM FOR PLASTIC SHAPED PARTS

(75) Inventors: Marco Rosendahl, Morsbach (DE); Markus Beer, Morsbach (DE)

(73) Assignee: IBS Filtran Kunststoff-/Metallerzeugnisse GmbH, Morsbach (DE)

( * ) Notice: Subject to any disclaimer, the term of this patent is extended or adjusted under 35 U.S.C. 154(b) by 840 days.

(21) Appl. No.: 10/258,177

(22) PCT Filed: Dec. 14, 2000

(86) PCT No.: PCT/EP00/12707

§ 371 (c)(1),
(2), (4) Date: Feb. 7, 2006

(87) PCT Pub. No.: WO01/81188

PCT Pub. Date: Nov. 1, 2001

(65) Prior Publication Data

US 2006/0157487 A1    Jul. 20, 2006

(51) Int. Cl.
*F16N 33/00* (2006.01)
*F16B 31/00* (2006.01)
*F16B 39/32* (2006.01)

(52) U.S. Cl. .......................... 184/1.5; 411/7; 411/128; 411/908

(58) Field of Classification Search .............. 411/6, 411/7, 907, 908, 166, 176, 127, 128, 326, 411/329; 184/1.5
See application file for complete search history.

(56) References Cited

U.S. PATENT DOCUMENTS

| | | | | |
|---|---|---|---|---|
| 781,067 A | * | 1/1905 | Hewitt | 403/44 |
| 802,360 A | * | 10/1905 | Patty | 81/161 |
| 3,173,569 A | * | 3/1965 | Craig | 220/304 |
| 3,405,837 A | * | 10/1968 | Carpenter, Jr. | 220/258.3 |
| 3,873,132 A | | 3/1975 | Czerwiak | |
| 3,889,839 A | * | 6/1975 | Simon et al. | 220/675 |
| 3,913,781 A | | 10/1975 | Andreux | |
| 4,114,779 A | * | 9/1978 | Stoll, III | 220/288 |
| 4,185,937 A | * | 1/1980 | Anderson | 403/316 |
| 4,362,255 A | | 12/1982 | Bond | |
| 4,785,963 A | * | 11/1988 | Magley | 220/266 |
| 4,823,411 A | | 4/1989 | Nettel | |
| 5,207,345 A | * | 5/1993 | Stewart et al. | 220/304 |
| 5,362,110 A | * | 11/1994 | Bynum | 285/87 |
| 5,971,189 A | * | 10/1999 | Baughman | 220/288 |
| 5,988,460 A | | 11/1999 | Brecheisen et al. | |
| 6,523,561 B2 | * | 2/2003 | Kapcoe et al. | 137/15.01 |
| 6,585,889 B2 | * | 7/2003 | Weingaertner | 210/172.2 |

(Continued)

FOREIGN PATENT DOCUMENTS

DE    3606052    7/1986

(Continued)

OTHER PUBLICATIONS

International Search Report for International Application No. PCT/EP00/12707, dated Mar. 15, 2001, published on Nov. 1, 2001 under No. WO 01/81188.

*Primary Examiner*—Flemming Saether
(74) *Attorney, Agent, or Firm*—Kramer & Amado, PC

(57) ABSTRACT

The present invention relates to a seal system for plastic moldings and to the use of the seal system in the engine fluid sector.

17 Claims, 3 Drawing Sheets

U.S. PATENT DOCUMENTS 7,585,408 B2 * 9/2009 Weindorf et al. ............. 210/86
2010/0006376 A1 * 1/2010 Jessberger et al. ........... 184/1.5

FOREIGN PATENT DOCUMENTS

| EP | 0 461 344 | 3/1991 |
| EP | 0 671 339 | 3/1995 |
| GB | 1 448 850 | 9/1976 |

* cited by examiner

CLOSING SYSTEM FOR PLASTIC SHAPED PARTS

FIELD OF THE INVENTION

The present invention relates to a seal system for plastic moldings and to the use of the seal system in the engine and transmission fluid sector.

BACKGROUND OF THE INVENTION

On systems in the engine or transmission compartment that come into direct contact with oil, seal systems for filling or draining the oil are required now and then. For the design of such seal systems a construction is usually chosen based on a combination of metal and plastic. This involves the use of profile seals or O-ring seals that ensure sealing between themselves or with the component being sealed. Even on housing components made of plastic, the filling and draining screws and their threads of the prior art are made of metal. Oil pans with seal systems of the prior art, for example, are produced by coating threaded bushings made of metal, usually of steel or brass, in the thermoplastic injection mold or subsequently pressing them with heat or with the aid of ultrasound into a location pre-molded in the plastic housing.

Another process involves pressing threaded bushings with a collar into the plastic container. This means that the embedded metal bushing has to satisfy exacting requirements in terms of retaining strength and positional accuracy. When threaded bushes are coated and the tolerances on the bushing or in the injection mold or the injection molding parameters are changed, there is a risk of the molten plastic penetrating at the ends of the bushing or even into the thread turns. On plastic moldings whose bushings are pressed in with heat or with the aid of ultra-sound there is the problem that molten plastic can also escape at the places mentioned above. Another problem concerns the recycling of such plastic moldings with embedded metal parts, since separating these different materials is a very complicated process.

The technical object was therefore to provide seal systems for sealing housing components made of plastic that avoid the above-mentioned problems and permit a reduction in cost, weight and process risks.

SUMMARY OF THE INVENTION

The technical object is achieved by a seal system for plastic moldings comprising a plastic screw 2 and an internal thread 4 which is molded into the plastic molding and receives the plastic screw 2, said thread being made of plastic.

DETAILED DESCRIPTION OF THE EMBODIMENT

Figure 1:
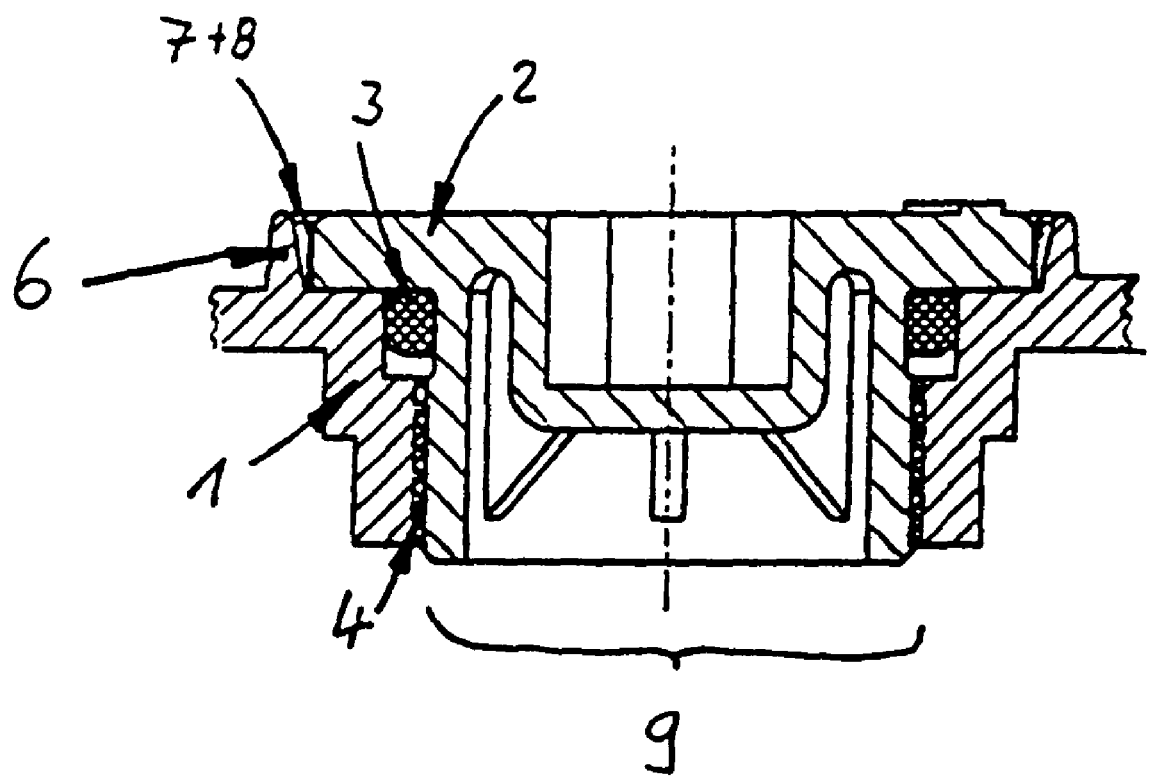
FIG. 1 shows a cross section of the inventive seal system.

The present invention permits the direct integration of a seal system in the housing component being sealed and ensures the functions required for such components throughout their service life. The elimination of additional metal parts such as threaded bushings to transmit the tightening forces in the area of the thread advantageously yields a marked reduction in the number of individual components, production time, production costs and weight. As a result of direct integration in the contours of the housing component, the design of the seal system in plastic also permits the choice and use of the optimum position, shape and orientation. The inventive seal system also satisfies the demands of the automotive industry for a recycling-friendly design that eliminates the cost-intensive and complex separation of plastic and metal parts.

In a preferred embodiment, the thread 4 is integrated in the plastic material of the plastic molding 1.

In another preferred embodiment, the plastic screw 2, plastic molding 1 and thread 4 are made of the same material. In a particularly preferred fashion, the plastic screw 2, plastic molding 1 and thread 4 are made of polyamide 6.6 GF 35%.

In another especially preferred embodiment, a seal element 3 is arranged between the screw made of plastic 2 and the opening 9 in the plastic molding.

In another especially preferred embodiment the plastic screw 2 is given a tightening contour 5. The tightening contour 5 is preferably a hexagon socket, hexagon projection or groove contour.

In another especially preferred embodiment, a rib 6 partly or wholly surrounding the opening 9 is provided on the plastic molding. A catch 7 is preferably applied to the plastic screw 2 and a catch 8 to the plastic molding, thus achieving a positive engagement between the plastic screw 2 and the plastic molding. The catch 8 is especially preferably applied to the rib 6. In an especially preferred embodiment, the catch 7 is applied to the head of the plastic screw 2.

The positive engagement is achieved through the interaction of the catches 7, 8 molded onto the screw head and the housing respectively. This prevents the plastic screw from becoming released or loosening or falling out by itself due to vibrations to or a temperature change during its service life.

By adapting the two catches 7, 8 to each other, the screw can only be turned with the application of extra force. In an especially preferred embodiment, the tightening torque of the plastic screw 2 is up to 8 Nm due to the catches 7, 8. The releasing torque of the plastic screw 2 is preferably is up to 8 Nm due to the catches 7, 8. In an especially preferred embodiment, the releasing torque of the plastic screw 2 is up to 5 Nm due to the catches 7, 8. Due to the settling and creep properties of plastic during its service life and because of temperature, a loss of tightening torque of up to about 3 Nm usually occurs. The remaining tightening torque of up to 5 Nm is sufficient to ensure the plastic screw's tight fit with the retention of its function. The overmeasure of the catch ensures that the release or loosening of the screw and the associated loss of liquid or leakage are prevented.

The inventive seal system is used in the engine fluid sector. Oil pans of the transmission and of the engine and the tank for cooling fluid or brake fluid can thus be equipped with the seal system.

The purpose of the plastic screw is to permit the filling and draining of liquids, preferably of oil or cooling water. A seal element held between the plastic screw and the housing, preferably an O-ring seal, performs the sealing task. The sealing function is designed and ensured independently of the releasing torque in the thread and in the catch. The filling and draining screw keeps the seal element in position independently of the releasing or tightening torques existing in the thread or in the catch.

FIG. 1 shows a cross section of the inventive seal system. The plastic screw 2 is fully screwed into the thread 4 of the plastic molding 1 and thus fully seals the opening 9 of the plastic molding 1. In this embodiment a rib 6 surrounds the opening 9 on the plastic molding 1. The plastic screw 2 has a screw head whose dimensions are adapted to the rib 6. First and second engagement means in the form of catches 7 and 8 are applied to the rib 6 and to the screw head. A seal element 3 is arranged between the screw and the plastic molding and seals the opening.

Figure 2:
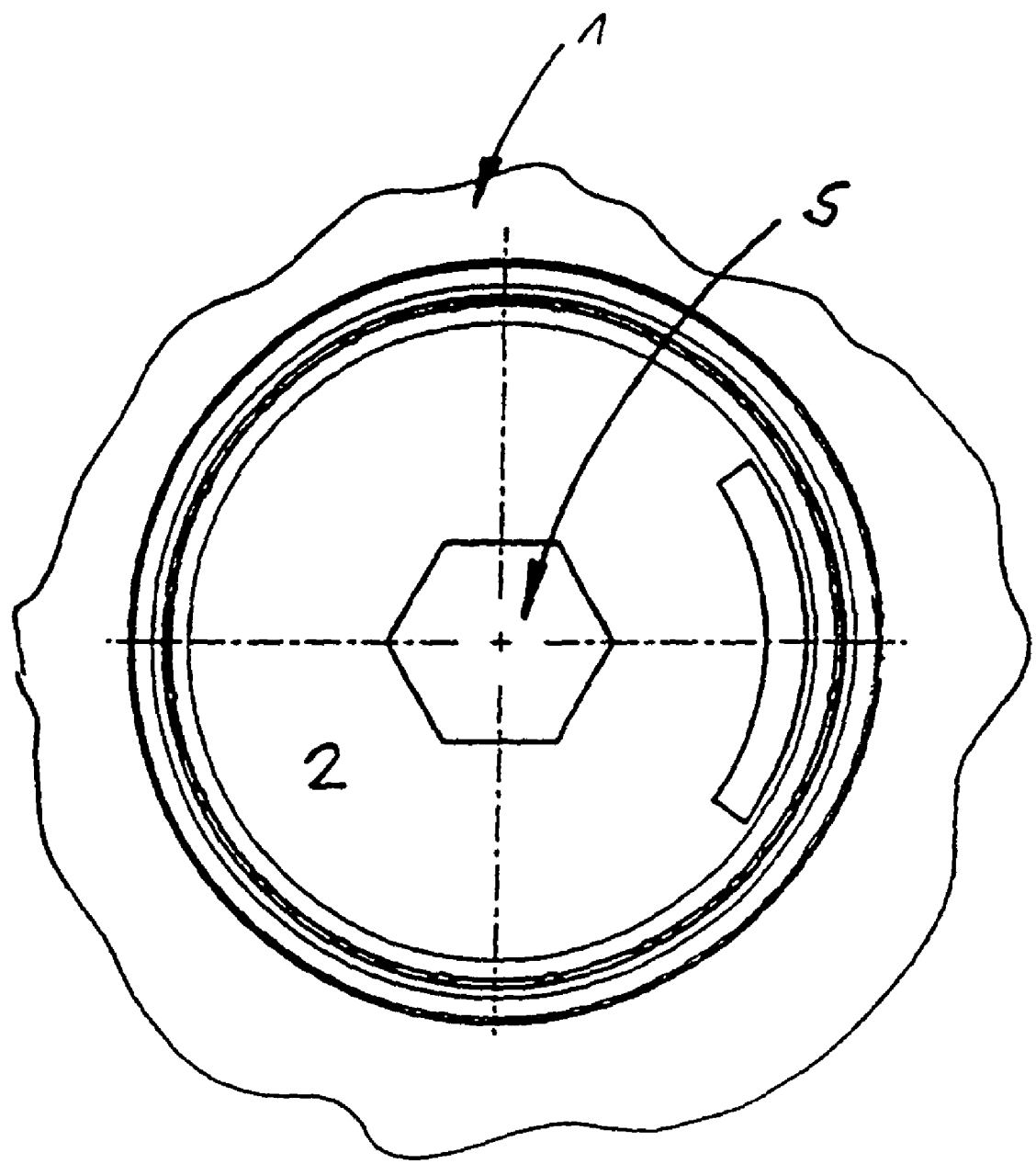
FIG. 2 shows a top view of the plastic screw.

FIG. 2 shows a top view of the plastic screw. In this figure the plastic screw 2 is given a tightening contour 5, which in this case is designed as a hexagon socket.

Figure 3:
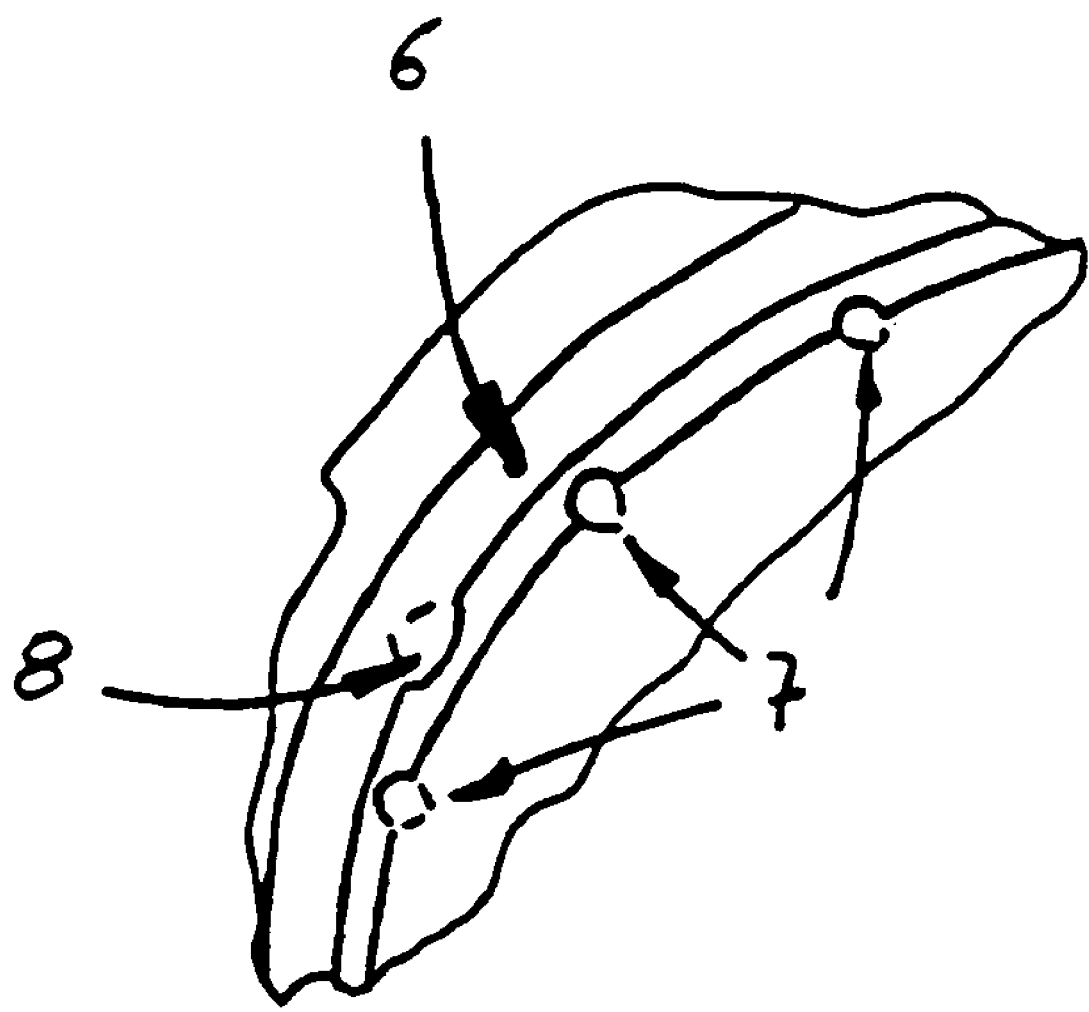
FIG. 3 shows a detail of the edge area of the plastic screw

FIG. 3 shows a detail of the edge area of the plastic screw. The rib 6 with the catch 8 can be seen as well as the edge of the plastic screw and its catch 7.

KEY TO THE DRAWINGS

1 Plastic molding
2 Plastic screw
3 Seal element
4 Thread
5 Tightening contour
6 Rib
7 Catch on the plastic screw
8 Catch on the rib
9 Opening

The invention claimed is:

1. A transmission oil pan seal system, comprising:
a molded plastic transmission oil pan component defining a circular opening;
internal threads disposed around the opening;
a plastic screw cap closure having an external periphery and sized to fit inside the opening to close off the opening;
external threads provided around the periphery of the screw;
a rib projecting from the housing in the axial direction outside of the opening and surrounding the opening, with a diameter larger than the diameter of the opening;
a first catch projecting radially inward from the rib; and
a second catch disposed adjacent the periphery of the screw and projecting radially outward from the screw;
wherein the external threads and internal threads are configured to engage when rotated in a tightening direction and the first and second catches are configured to overlap each other in the radial direction, and configured so that rotation of the screw in the tightening direction causes the first and second catches to provide a first resistance force against rotation in the tightening direction, and causes the first and second catches to pass each other when the tightening rotation application force is greater than the first resistance force,
wherein after passing each other in the tightening direction, the first and second catches are configured to interlock so that release or loosening of the screw in the loosening direction is resisted, and thereafter so that loosening rotation of the screw in the loosening direction causes the first and second catches to provide a second resistance force against rotation in the loosening direction, and causes the first and second catches to pass each other when the loosening rotation application force is greater than the second resistance force, and
wherein after passing each other in the loosening direction, the first and second catches permit further rotation for removal of the screw.

2. The seal system according to claim 1, wherein the thread is integrated in the plastic material of the plastic molding.

3. The system according to claim 1, wherein the plastic screw, plastic molding and thread are made of the same material.

4. The seal system according to claim 3, wherein the plastic screw, plastic molding and thread are made of polyamide 6.6 GF 35%.

5. The seal system according to claim 1, wherein a seal element is arranged between the screw made of plastic and the opening in the plastic molding.

6. The seal system according to claim 1, wherein the plastic screw has a tightening contour.

7. The seal system according to claim 6, wherein the tightening contour is selected from the group consisting of a hexagon socket, hexagon projection and groove contour.

8. The seal system according to claim 6, wherein a catch is applied to the plastic molding, thus forming a positive engagement between the plastic screw and the plastic molding.

9. The seal system according to claim 8, wherein the first catch is applied to the head of the plastic screw.

10. The seal system according to claim 8, wherein the tightening torque of the plastic screw is up to 8 Nm due to the catches.

11. The seal system according to claim 8, wherein the releasing torque of the plastic screw is up to 8 Nm due to the catches.

12. The seal system according to claim 8, wherein the releasing torque of the plastic screw is up to 5 Nm due to the catches.

13. The seal system according to claim 1, wherein the first and second catches are configured so that the first resistance force is substantially equal to the second resistance force, with the first and second resistance forces being in opposite rotational directions.

14. The seal system according to claim 1, wherein, when fully tightened, an upper surface of the screw cap closure is substantially flush with a top of the rib.

15. A transmission oil pan seal system, comprising:
a molded plastic transmission oil pan component defining a circular opening;
internal threads disposed around the opening;
a plastic screw cap closure having an external periphery and sized to fit inside the opening to close off the opening;
external threads provided around the periphery of the screw;
a rib projecting from the housing in the axial direction outside of the opening and surrounding the opening, with a diameter larger than the diameter of the opening;
a first engaging means disposed adjacent the periphery of the screw and projecting radially outward from the screw;
wherein the external threads and internal threads are configured to engage when rotated in a tightening direction and the first and second engaging means are configured to overlap each other in the radial direction, and configured so that rotation of the screw in the tightening direction causes the first and second engaging means to provide a first resistance force against rotation in the tightening direction, and causes the first and second catches to pass each other when the tightening rotation application force is greater than the first resistance force,
wherein after passing each other in the tightening direction, the first and second engaging means are configured to interlock so that release or loosening of the screw in the loosening direction is resisted, and thereafter so that loosening rotation of the screw in the loosening direction causes the first and second catches to provide a second resistance force against rotation in the loosening direction, and causes the first and second catches to pass each other when the loosening rotation application force is greater than the second resistance force, and wherein after passing each other in the loosening direction, the first and second catches permit further rotation for removal of the screw.

16. The seal system according to claim 15, wherein the first and second catches are configured so that the first resistance force is substantially equal to the second resistance force, with the first and second resistance forces being in opposite rotational directions.

17. The seal system according to claim 15, wherein when fully tightened, an upper surface of the screw cap closure is substantially flush with a top of the rib.

* * * * *